United States Patent [19]

Mahmoodi et al.

[11] Patent Number: 4,571,635
[45] Date of Patent: Feb. 18, 1986

[54] METHOD OF IMAGE ENHANCEMENT BY RASTER SCANNING

[75] Inventors: A. B. Mahmoodi, Minneapolis; Owen L. Nelson, St. Paul, both of Minn.

[73] Assignee: Minnesota Mining and Manufacturing Company, St. Paul, Minn.

[21] Appl. No.: 581,333

[22] Filed: Feb. 17, 1984

[51] Int. Cl.⁴ .............................................. H04N 7/12
[52] U.S. Cl. .................................... 358/284; 382/54
[58] Field of Search ............... 358/166, 284; 382/41, 382/54

[56] References Cited

U.S. PATENT DOCUMENTS

| 4,237,481 | 12/1980 | Aughton | 358/80 |
| 4,311,914 | 1/1982 | Huber | 382/54 |
| 4,315,318 | 2/1982 | Kato et al. | 364/515 |
| 4,317,179 | 2/1982 | Kato et al. | 364/515 |
| 4,334,244 | 6/1982 | Chan et al. | 358/166 |
| 4,346,409 | 8/1982 | Ishida et al. | 358/280 |
| 4,355,337 | 10/1982 | Sekigawa | 358/284 |
| 4,356,555 | 10/1982 | Ejiri et al. | 358/284 |
| 4,437,122 | 3/1984 | Walsh et al. | 358/284 |
| 4,499,597 | 2/1985 | Alves | 382/54 |

Primary Examiner—Edward L. Coles, Sr.
Attorney, Agent, or Firm—Donald M. Sell; James A. Smith; Mark A. Litman

[57] ABSTRACT

A method of enhancing images comprises making a point-by-point record of an image with successive pixels in a logical array, determining the standard deviation of the pixels, determining an effective central pixel value, and then displaying or recording the image using the determined central pixel values.

21 Claims, 1 Drawing Figure

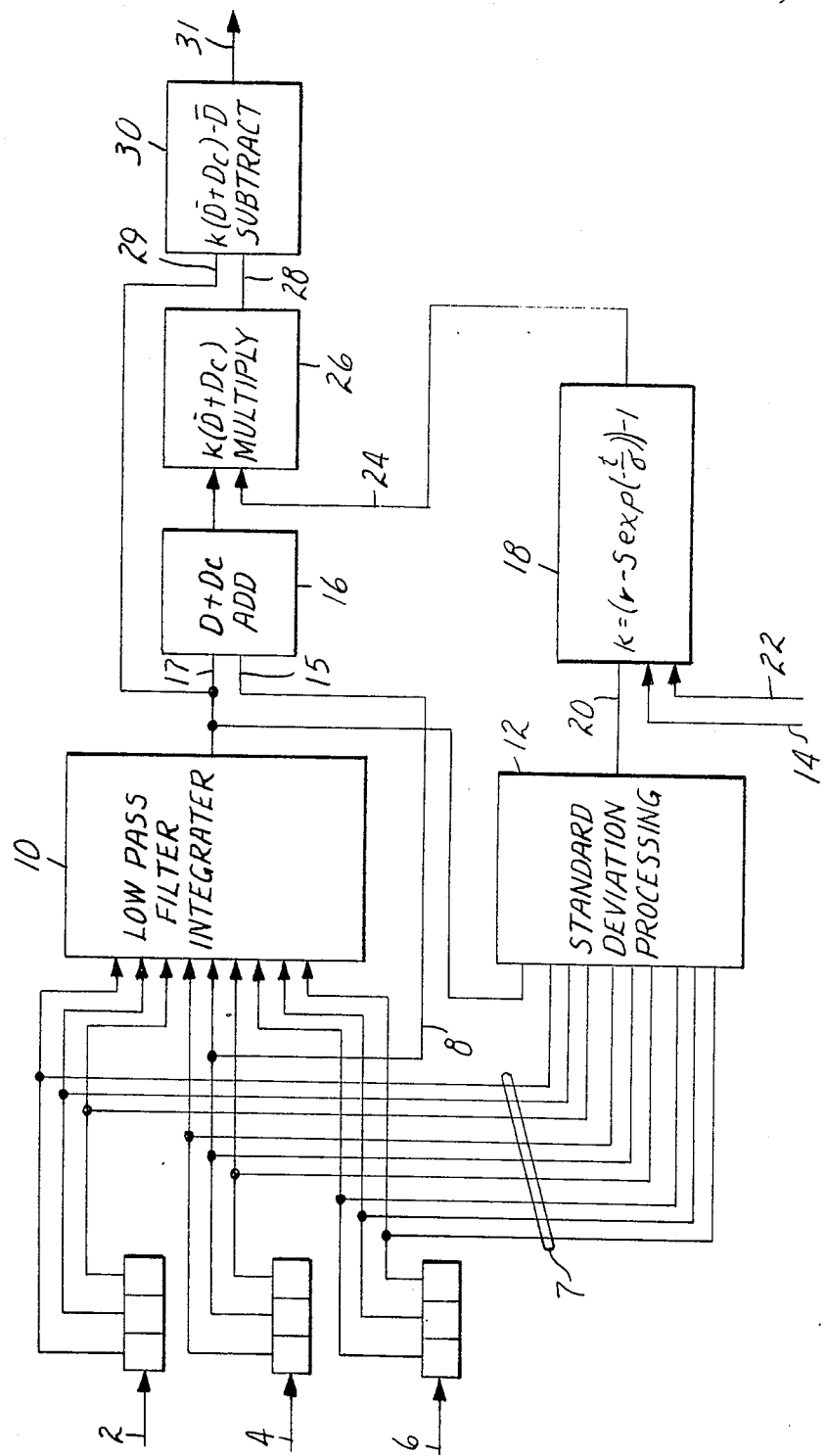

METHOD OF IMAGE ENHANCEMENT BY RASTER SCANNING

BACKGROUND OF THE INVENTION

1. Field of the Invention

The present invention relates to a method of enhancing a radiation image, particularly a radiation image recorded on intensifying screens by exposure to readiation, particularly X-rays. This process is particularly useful in non-destructive testing such as industrial x-rays, diagnostic imaging for medical purposes, and the like. The process is used with phosphors that store energy from incident radiation and release a different type or wavelength of radiation when stimulated. The process of the present invention enhances the image released upon stimulation of the excited phosphors.

2. Description of the Prior Art

Recorded images are a spatial, normally planar, representations of either spatially or temporally variable original signals. A large proportion of such recordings, such as copies of documents and pictures, represent a one to one relationship with an original document or scene, frequently with magnification or reduction involved. Radiographic film images in medicine represent a class of images where the original is not visible to the human eye and must be formed by a combination of invisible radiation (e.g. x-rays) and a suitable transducer (fluorescent screen).

In all image forming systems, degradation of the original information occurs which normally manifests itself in two forms—(1) blurring of edges (reduced resolution, lower sharpness) and (2) random irregularities (noise, fog). In normal photographic images it has long been known that edge sharpness can be enhanced and noise reduced by masking the original with a negative unsharp mask of suitable contrast (usually lower than that of the original). Early work by J. A. C. Yule is representative of this photographic masking approach (U.S. Pat. Nos. 2,407,211, 2,420,636, 2,455,849) and more complex approaches are represented by Blearson et al in U.S. Pat. No. 3,615,433. An early attempt to use a raster scan of the image while measuring the instantaneous light values photoelectrically and attenuating the beam according to a predetermined relationship with the light value is disclosed by Folse in U.S. Pat. No. 3,011,395. The rapid development of the Space Program lead to the emergence of high efficiency digital means of analyzing, reconstituting and enhancing images. Median filtering as a means of enhancing edge contrast has also been studied (e.g. B. R. Frieden JOSA 66. 280-283 (1976)). In the medical radiography field this stimulated the development of computerized tomography and the digital processing of radiographs in general (S. R. Amety et al, SPIE 207, 210-211 (1979), and C. R. Wilson et al, SPIE 314, 327-330 (1981)). In these approaches the image has been divided into a large number of "pixels" by scanning. A moving window consisting of n×m pixels centered on pixel i with image value $D_i$ is investigated by an on line computer as pixels i are scanned. The arithmetic average $\overline{D}$ of the pixels within the window is then used to modify the central pixel value $D_i$ to a filtered value $D'_i$ by the algorithm $$D'_i = aD_i - b\overline{D}$$

The parameters a and b are chosen to give specific image characteristics but are constant over the scan of a single image.

The concept of varying parameters similar to a and b throughout the scan of the image based on certain local properties of the image has been studied and these patents (H. Kato et al U.S. Pat. Nos. 4,315,318 and 4,317,179 and M. Ishida et al U.S. Pat. No. 4,346,409) have disclosed particular relationships between the parameters and the values of $D_i$ or $\overline{D}$ which can give further image enhancement. These techniques do not however distinguish between noise and image edges as far as enhancement is concerned, and the higher the density $D_i$ or $\overline{D}$ the greater the enhancement. In other technology areas similar approaches have been made. Thus in E. Alparslau and F. Ince IEEE Vol SMC-11, 376-384 (1981) images are treated with an edge enhancement algorithm based in part on an adaptive parameter based on the difference between the maximum and minimum pixel values in the window at any point. In U.S. Pat. No. 4,237,481 final image data for printing plate production is treated by electronic circuits according to algorithms which combine sharp and unsharp image data with pixel parameters. U.S. Pat. No. 4,334,244 treats video signal images electronically according to algorithms based on the fixed average and wherein values acting on the instantaneous gradient of the image signal, the degree of edge enhancement being partly controlled by the dynamic noise of the system.

SUMMARY OF THE INVENTION

The invention concerns an adaptive edge and contrast enhancement technique for images, particularly for radiographs based on modified unsharp masking treatments.

The primary image (e.g., radiographic signal or a copy of it) is raster scanned by one of a variety of techniques known in the art to produce an array of pixel image values (e.g. density, transmission, radiant, flux, electric current or voltage, etc). This invention teaches a particularly advantageous technique of treating that array of pixels.

This filtering technique is based on a sliding window which moves across the image in both vertical and horizontal directions. At each step the density value of the center pixel in the window is transformed to a new value via a filtering equation of the same form as that reported above from Ainety et al and Wilson et al, namely $$D'_i = aD_i - b\overline{D}$$

The improvement we offer is that whereas previously a and b were constant for the given feature or at best were varied over the picture as a function of the values of $D_i$ or $\overline{D}$, our algorithm values a and b over the picture as a function of the standard deviation of the values of the pixels within the window at any time in the scan. This algorithm is superior to that of the electronic or digital simulations of unsharp masking reported in the past few years, in the sense that it does not uniformly enhance the high frequency noise components of the stored image for the sake of edge enhancement. Since the parameters of this filtering algorithm are adaptively adjusted according to the statistics of the local area (window), there are no user (operator) interactions required.

The relation between the size of the sliding window, the degree of enhancement, and the stability of the filter are shown in applications concerning visualization of digital angiograms and chest radiographs.

Although the examples presented here are primarily concerned with medical radiographs for which the technique is eminently suitable, other types of images may also be treated. The technique is most suitable for stored images like photographs, printed images, magnetic tape or disk records, optical disk records etc in which the important noise experienced originates from the static noise frozen into the record rather than the dynamic noise originating from the reproduction system. It is therefore less suitable for real-time video displays in which the dynamic noise often predominates. There does indeed exist considerable art addressed to the latter problem.

In addition to the above-mentioned imaging techniques and systems, the process and apparatus of the invention may be used with lapid systems. These are systems and methods for establishing an electrostatic charge image and a readout of the image which includes the use of a multilayered photoconductive device, a D.C. voltage source connected across the device to provide a high electric field across the device while a radiation source is used to expose the device to a radiation image to produce an electrostatic image at a layer of the device and a scanner for scanning the device with readout radiation while readout electronics and the D.C. voltage source are connected in series across the device. For example, the device may include a first conductive layer, an insulative layer a photoconductive insulative layer and a second conductive layer in that order wherein the successive layers are contiguous when the system uses light or x-rays to provide a radiation image. The use of the D.C. voltage source during readout provides a source to support the charge flow that is initiated by the readout radiation directed to a portion of the device. Such charge flow is detected by the readout electronics, since it is in series with the D.C. voltage source.

The pixel size chosen will of course vary with the type of image involved. In particular images with high information density will require small pixels whereas larger pixels may be acceptable for lower information densities.

BRIEF DESCRIPTION OF THE DRAWING

The FIGURE shows a flow chart for the operation of the process of the present invention.

DETAILED DESCRIPTION OF THE DRAWING

The hardware and software configuration for the operation of the process of this invention for a-three-by-three window is shown by way of a flow chart in the FIGURE.

A line scan of the three rows of three pixels is shown by number 2, 4, and 6. The center pixel in line scan 4 is the actual pixel of the image being focused on. The scan signal information taken from the pixels is treated in two ways. A tapped delay 7 is processed to determine the standard deviation by computer 12 operation. The scan signal information is also processed by a low pass filter integrator 10. The integrated density $\overline{D}$ is then added 17 to the central pixel density $D_c$. That latter value 15 is taken directly from the scan signal information of the central pixel of the second line scan 4. The determined limiting coefficient S (14) is then directed along with t (22) and the determined standard deviation $\sigma$ (20) to calculate the emphasis coefficient k by computer 18 according to the equation $k=(r-S \exp(-t/\sigma))-1$. The emphasis coefficient k is then directed 24 to another step along with the sum of $\overline{D}$ and $\overline{D}_c$ produced by step 16 to be multiplied 26 as $K(\overline{D}$ plus $D_c)$. That product is then directed to another step in the program 30 where the integrated density $\overline{D}$ (29) is substracted from the product of $K(\overline{D}$ plus $D_c)$ to generate the value (31) for the effective pixel density $D_c'$.

DETAILED DESCRIPTION OF THE INVENTION

Due to the wide dynamic range of attenuation values in electronically scanned images, digital image processing is often used to reduce (suppress) the low frequency content of information. Psychophysical experiments have also indicated that an image with accentuated edges is often more subjectively pleasing for viewing since it can increase the visual perception. One method that has been used widely in applications regarding visualization of computed radiographic image for medical diagnostics is the technique of unsharp masking. In this process the image is scanned by two overlapping apertures, one at normal resolution $X(i,j)$ and the other at a lower resolution $X(i,j)$. Thus, a masked digital image can be formed as $$X_M(i,j) = CX(i,j) - (1-C)X(i,j) \tag{1.1}$$

where i,j correspond to the coodinate (row-column) of a given picture element (pixel). C is a weighting parameter of the above equation.

The low resolution image can be considered as a low pass filter or an integrator and the normal resolution approximately as an all pass filter. Subtraction of the above terms would form a modified high pass filter which then can be referred to as an unsharp mask filter.

Various degrees of enhancement can be achieved by adjusting the parameter C. The greater the absolute values for C, the greater the image contrast and edge enhancement that can be accomplished. At the same time, however, image noise will also be enhanced. Such systems have been disclosed in the art but only with C a constant for a given image or with C varied as a function of X or $\overline{X}$. These give enhanced edge sharpness at the expense of increased noise. The present method uses an algorithm which provides the effect of unsharp masking in sharpening the edges and contrast to obtain an enhanced image without the disadvantage of uniformly enhancing the high frequency noise component of an image.

This algorithm is applied to pixels selected by a sliding window, which moves across the image in both vertical and horizontal directions. The size of the window may be as small as 5 pixels (3×3 with no corners), up to a very large number. The larger the number, the greater the potential for elimination of useful detail. A useful limit of a 15×15 pixel window (225 pixels) is workable, with 5-100 pixels as a preferred limit. More preferred would be ranges of 5-81 and 5-64 pixels per window. At each step the center pixel density $D_c$ of this window is transformed to a new value $D_c'$, upon the following mathematical equation $$D_c' = aD_c - b\overline{D} \tag{2.1}$$

where D represents the mean level or low resolution signal of the window. The parameters a and b are identified and adjusted on line in the following fashion. For the sake of simplicity set a=1 since it is well known in the art how to apply a simple scaling factor to D'.

$$D_c' = D_c - b\overline{D} \tag{2.2}$$

As the value of b increases, the degree of edge enhancement will also increase, as long as the quantity $(D_c - b.\overline{D})$ is positive. Once this quantity becomes negative, then there will be a need for scale adjustment. In most cases it has been determined that a useful bound for b will be in the range 0<b<1, where b=0 corresponds to normal resolution (original image) and as b increases from 0 to 1 the edges on the image become sharply emphasized. It was also observed that the above technique compresses the dynamic signal range of the image (histogram compression), resulting in reduction of brightness and loss of vital information. In order to remedy this situation, we normalize the above equation (2.2) by dividing (2.2) by (1-b) hence we get $$D_c' = \frac{D_c}{1-b} - \frac{b}{1-b}\overline{D} \tag{2.3}$$

This modification then keeps the histogram from compressing and also prevents the filter equation from being negative. Thus putting $$k = \frac{1}{1-b} \text{ so that } \frac{b}{1-b} = 1 - k$$

Equation (2.3) can be easily represented as $$D_c' = kD_c - (1-k)\overline{D} \tag{2.4}$$

Notice that Equation (2.4) is the same unsharp masking filter equation that is given in equation (1.1).

The greater the absolute value for k, the more emphasis on edges that can be obtained (high pass spatial filtering); however, at the same time high spatial frequency image noise will also be increased. In the algorithm that we disclose here, we make the coefficient k adaptive to change in the image scene. Where an edge is crossed, emphasis is desired (large coefficient k) to perform the image edge and contrast enhancement. In areas where there are no edges the emphasis coefficient is kept to a low level to minimize noise. As a result, edge and contrast enhancement are applied only to the area of an image where there are edges. In the disclosures of H. Kato et al the emphasis coefficient is controlled by $D_c'$ or $\overline{D}$ so that it is invoked in areas of overall high density just as much as on edges. This therefore emphasizes noise in the higher density areas.

In our invention we control the emphasis coefficient k with a statistical parameter associated with the window at any given position. In particular the standard deviation $\sigma$ of the pixel values within the window is used to produce a function $f(\sigma)$ which varies monotonically with $\sigma$ but has upper and lower bounds which are suited to the control of k as will be explained below.

When k is controlled in such a fashion two advantages over the prior art are obtained:
1. k is applied only in the immediate environs of an edge—the proximity to the edge being controlled by the window size.
2. lower bound values of k are applied to all areas where the density is relatively constant over areas greater than the window size i.e., those areas where no edge exist. Thus no noise enhancement occurs in relatively large uniform density areas.

A broad range of function $f(\sigma)$ may be used within the confines of their being monotonic in $\sigma$ and having upper and lower bounds which can be chosen at will.

We have found a particularly advantageous relation to be the inverse exponential function $$k = f(\sigma) = \left(r - S\exp\left(-\frac{t}{\sigma}\right)\right)^{-1} \tag{2.5}$$

where r, S, and t are parameters which may be chosen to suit the particular type of image to be scanned.
t defines the range of $\sigma$ values over which the emphasis coefficient operates
r defines the lower bound of k applied to uniform areas
S defines the upper bound of k applied to edges.
If we set t=0.1 the effective range of $\sigma$ over which k operates is 0.1<<10, for t=1.0 we have 1<<100 and for t=10, 10<<1000. This facility is of value both from one type of image to another, and as a scaling factor required by the units in which the pixel values are presented.

The lower bound of k arises from $\sigma=0$ when $k=1/r$ and the upper bound when $\sigma\to\infty$ when $$k = \frac{1}{r-S}.$$

In our work on radiographs we have found r=1.0, S=0.9 to give very valuable results. With the radiograph image generated electronically with 256 levels of gray the best range value was found to be t=1.0.

The function $f(\sigma)$ may be of other exponential forms or other forms which may be expressed in exponential form, e.g., hyperbolic functions, sinc function, etc.

EXAMPLE 1

The above mentioned adaptive algorithm was tested on several images with variable (odd) window sizes from 3×3 to 9×9 to 25×25, and compared them with the non-adaptive case (unsharp masking). Analysis and testing were performed on several aspects of the algorithm. First, the effect of size of the window vs. the 2nd order statistics (standard deviation) of the window were examined. It was found that as the window size increases, the standard deviation flattens out. As a result, this corresponded also to a lower coefficient setting for the adaptive filter. The next test was to compare the noise suppression of this adaptive algorithm with the non-adaptive case. The density of picture element vs. their position in one line of an angiogram image was examined. An edge crossing (vein) between pixel position 15 and 20 was noted. When the unsharp masking was applied with emphasis on the coefficient of c−0.85, that the noise in the image is enhanced. With adpative algorithm of the invention, the edges are enhanced, but not the noise in the background. The effect of various window sizes vs. the contrast of the image was also examined. As the size of the window increased, the degrees magnitude of contrasts edge enhancement also got higher.

EXAMPLE 2

In order to clearly demonstrate the advantage of this algorithm for noise reduction, a set of test target grids were used. The test images were taken using 3M Trimax film and were digitized using a laser scanner. Sample radiographs attached show the comparison of edge enhancement and noise reduction of the adaptive and non-adaptive algorithms.

EXAMPLE 3

The method of Example 2 was applied to a set of chest radiographs and equivalent results are shown in the equivalent radiographs.

EXAMPLE 4

Shown below is an actual computer program in FORTRAN limited to a 25×25 pixel window image enhancement process according to the present invention. The program was run in a Digital Equipment Corporation VAX 11/750 computer. A flow chart of the program is shown in the FIGURE.

Parameter list:
area: Window Area
a2: The sensitivity Parameter
fname1: Input file name
fname2: Output file name
icent: Center Pixel
imin: Minimum in i (row)
imax: Maximum in i (row)
iw: Window Area
ix2: Window Size
jmin: Minimum in j (column)
jmax: Maximum in j (column) ml: Input/Output Array
m: Maximum Size Window Array 25512
nout: Output Scan line
std: Standard Deviation
temp: Mean value of the local window
    equivalence (byt,iword4)
    byte fname1(63,10),fname2(63,10),m1512),byt
    integer*4 m(25,512),iword4
    dimension n1(512),mn(25,25),nout(512)
data jmin,imin,ix1/1,1,1/
do 20 i=1,20
  fname1(i,1)="0
  fname2(i,1)="0
20
  type 30
30
  format(x,' enter input file ',$)
  accept 31,nc,(fname1(i,1),i=1,nc)
31
  format(q,63a)
  type 32
32
  format(x,' enter output file ',$)
  accept 33,,nc,(fname2(i,1),i=1,nc)
33
  format(q,63a)
  type 34
34
  format(x,' enter window size ',$)
  accept 35,i×2
35
  format(i2)
  type 36
36
  format(x,' enter sensitivity coeff ',$)
  accept 37,a2
37
  format(f6,3)
  file opening section
  open (unit=1,name=fname1(1,1),access='direct'
1,status='old',readonly,form='unformatted'-
,rec1=128)    open(unit=2,name=fname2(1,1),access='direct'
1,status='new',form='unformatted',rec1=128)
icent=ifix((i×2+1)/2.)
id=icent
iw=i×2*i×2
area=float(iw)

The Main Body of the Program
40
  imax=imin+i×2−1
  jmin=1
  jmax=jmin+i×2−1
  k=1
  if(imin.gt.1)go to 100
  do 50 i=imin,imax
    read(1,rec=i,err=999) ml
    do 55 j=1,512
      byt=ml(j)
      m(k,j)=iword4
55
  continue
  k=k+1
50
  continue
  go to 1000
100
  read(1,rec=imax,err=999) ml
  do 60 i=1,i×2−1
    do 60 j=1,512
      m(i,j)=m(i+1,j)
60
  continue
  do 65 j=1,512
    byt=ml(j)
    m(i×2,j)=iword4
65
  continue
1000
  continue
  temp=0.0
  xsd=0.0
  do 70 i=i×1,i×2
    do 70 j=jmin,jmax
      temp=temp+m(i,j)
      xsd=xsd+((m(i,j)*m(i,j)/area))
70
  continue
  std=sqrt(abs(xsd−temp*temp/(area**2)))
  The standard deviation & empasize calculation
  if(std.lt.0.001)std=0.001
  al1=0.9* exp(−a2/std)
  ic=ifix((imin+imax)/2.)
  jc=ifix((jmin+jmax)/2.)
  final pixel value calculation
  nout(jc)=(m(icent,jc)−(a1*temp)*(1./area))/(1-
.−al)
  if(nout(jc).le.0) nout(jc)=0
  if(nout(jc).ge.255) nout(jc)=255
  if(jmax,eq.512) go to 101
  jmin=jmin+1
  jmax=jmin+i×2−1
  go to 1000
  do 110 j=1,icent−1
    nout(j)=m(icent,jc)
    nout(j+jc)=m(icent,j+jc)

```
110   continue
      if(ic.eq.icent)go to 120
      go to 130
      do 150 i=1,icent−1
        read(1,rec=1, err=999) ml
        write(2,rec=i,err=999) ml
150   continue
      do 160 j=1,512
        iword4−nout(j)
        ml(j)=byt
160   continue
      write(2,rec=id,err=999) ml
      if(id.eq.500)go to 200
      imin=imin+
      id=id+1
      go to 40
      do 180 i=501,512
        read(1,rec=i,err=999) ml
        write(2,rec=i,err=999) ml
180   continue
      close(unit=1)
      close(unit=2)
      stop
      end
```

We claim:

1. A method of displaying or recording an image showing enhanced detail relative to an original image or record comprising:
   (a) making a point by point record of the original image by scanning it in a manner to select successive pixels in a logical array,
   (b) storing the pixel values in such a way and for such a period that a window comprising a sub-array of adjacent pixels can be selected and analysed statistically said window comprising between 5 and 225 pixels,
   (c) analyse the pixel values of the window surrounding each pixel in turn to give the average value $\bar{D}$ and the standard deviation $\sigma$,
   (d) processing the central fixed value $D_c$ to give an improved value $D'_c$ such that $$D_c' = kD_c + (1-k)\bar{D}$$

wherein k is a variable having a value between 0 and 0.99 which varies from pixel to pixel based on the value of $\sigma$, said value of k being related monotonically to $\sigma$ in such a way as to have an upper and lower bound within the said range 0 to 0.99,
   (e) displaying or recording the enhanced image based on the derived values $D_c'$.

2. The method of claim 1 in which k increases monotonically with $\sigma$, and the window comprises between 5 and 100 pixels.

3. The method of claim 1 in which k decreases monotonically with $\sigma$, and the window comprises between 5 and 100 pixels.

4. The method as in claim 1 in which k is an increase exponential function of $\sigma$ with an upper bound and a lower bound both lying in the range 0 to 0.99.

5. A method as in claim 3 in which the relation ship of k with $\sigma$ is $$k = (r - S \exp(-t/\sigma))^{-1}$$

which had an upper bound $k_u$ and a lower bound $k_1$ such that $k_u > k_1$, the parameters r and S being chosen such that $r = 1/k_1$ and $S = 1/k_1 - 1/k_u$, and the value of the parameter t is in the range 0 to 2000.

6. The method of claim 1 in which the original image is or the record represents a radiograph, and the window comprises between 5 and 81 pixels.

7. The method off claim 5 in which the original image is or the record represents a radiograph.

8. The method of claim 1 in which the original image is or the original record represents one of the color separations of a color picture.

9. The method of claim 5 in which the original image is or the original record represents one of the color separations of a color picture.

10. The method of claim 1 in which the original image is or the original record represents a monochrome picture.

11. The method of claim 5 in which the original image is or the original record represents a monochrome picture.

12. The method of claim 1 in which the original record comprises an electric signal time sequence obtained by:
    (a) exposing stimulable phosphor to radiation which will cause an imagewise storage of energy by the phosphors,
    (b) scanning said stimulable phosphor with radiation that will cause said imagewise storage of energy to be released in a different form of energy or at a different wavelength than the exposing energy,
    (c) reading out said released energy and converting it into an original electric signal.

13. The method of claim 5 in which the original record comprises an electric signal time sequence obtained by:
    (a) exposing stimulable phosphor to radiation which will cause an imagewise storage of energy by the phoshpors,
    (b) scanning said stimulable phosphor with radiation that will cause said imagewise storage of energy to be released in a different form of energy or at a different wavelength than the exposing energy,
    (c) reading out said released energy and converting it into an original electric signal.

14. The method of claim 6 in which the original record comprises an electric signal time sequence obtained by:
    (a) exposing stimulable phosphor to radiation which will cause an imagewise storage of energy by the phosphors,
    (b) scanning said stimulable phosphor with radiation that will cause said imagewise storage of energy to be released in a different form of energy or at a different wavelength than the exposing energy,
    (c) reading out said released energy and converting it into an original electric signal.

15. The method of claim 8 in which the original record comprises an electric signal time sequence obtained by:
    (a) exposing stimulable phosphor to radiation which will cause an imagewise storage of energy by the phosphors,
    (b) scanning said stimulable phosphor with radiation that will cause said imagewise storage of energy to be released in a different form of energy or at a different wavelength than the exposing energy, (c) reading out said released energy and converting it into an original electric signal.

16. The method of claim 10 in which the original record comprises an electric signal time sequence obtained by:
   (a) exposing stimulable phosphor to radiation which will cause an imagewise storage of energy by the phosphors,
   (b) scanning said stimulable phosphor with radiation that will cause said imagewise storage of energy to be released in a different form of energy or at a different wavelength than the exposing energy,
   (c) reading out said released energy and converting it into an original electric signal.

17. The method of claim 1 in which the original record comprises an electric signal time sequence obtained by:
   (a) providing an imaging system in which a multilayered device having a photoconductive insulative layer is used to provide an electrostatic charge image at a layer of the device in response to imaging radiation directed onto the device,
   (b) scanning the imaged device with readout radiation synchronized with readout electronics connected to the said multilayered device so as to convert the electrostatic charge image to electrical signals.

18. The method of claim 5 in which the original record comprises an electric signal time sequence obtained by:
   (a) providing an imaging system in which a multilayered device having a photoconductive insulative layer is used to provide an electrostatic charge image at a layer of the device in response to imaging radiation directed onto the device,
   (b) scanning the imaged device with readout radiation synchronized with readout electronics connected to the said multilayered device so as to convert the electrostatic charge image to electrical signals.

19. The method of claim 7 in which the original record comprises an electric signal time sequence obtained by:
   (a) providing an imaging system in which a multilayered device having a photoconductive insulative layer is used to provide an electrostatic charge image at a layer of the device in response to imaging radiation directed onto the device,
   (b) scanning the imaged device with readout radiation synchronized with readout electronics connected to the said multilayered device so as to convert the electrostatic charge image to electrical signals.

20. A method of displaying or recording an enhanced radiation image comprising:
   (a) exposing stimulable phosphor to radiation which will cause an imagewise storage of energy by the phosphors,
   (b) scanning said stimulable phosphor with radiation that will cause said imagewise storage of energy to be released in a different form of energy or at a different wavelength than the exposing energy,
   (c) reading out said released energy and converting it into an original electric signal,
   (d) processing said original signal to produce an output signal in accordance with $$D_c'[D_c'] = kD_c + \overline{D}.(1-k)$$

wherein
   $D_c'$ is the strength of the enhanced image of a pixel,
   $D_c$ is the strength of image at the center pixel of a scanning window,
   $\overline{D}$ is the mean level of the strength of the image of the pixels in the window,
   k is a variable present during the process and having a value between 0 and 0.99 and which is related monotonically to the standard deviation of the fixed values within the scanning window and,
   (e) displaying a visual image in response to said output signal.

21. An apparatus for displaying or recording an image showing enhanced detail relative to an original image or record comprising:
   (a) means for making a point by point record of the original image by scanning it in a manner to select successive pixels in a logical array,
   (b) a means for storing the pixel values in such a way and for such a period that a window comprising a sub-array of adjacent pixels can be selected and analysed statistically said window comprising between 5 and 225 pixels,
   (c) a means for analysing the pixel values of the window surrounding each pixel in turn to give the average value $\overline{D}$ and the standard deviation $\sigma$,
   (d) a means for processing the central fixed value $D_c$ to give an improved value $D_c'$ such that $$D_c' = kD_c + (1-k)\overline{D}$$

wherein k is a variable having a value between 0 and 0.99 which varies from pixel to pixel based on the value of $\sigma$, said value of k being related monotonically to $\sigma$ in such a way as to have an upper and lower bound within the said range 0 to 0.99, and
   (e) a means for displaying or recording the enhanced image based on the derived values $D_c'$.

* * * * *